United States Patent Office 2,808,683
Patented Oct. 8, 1957

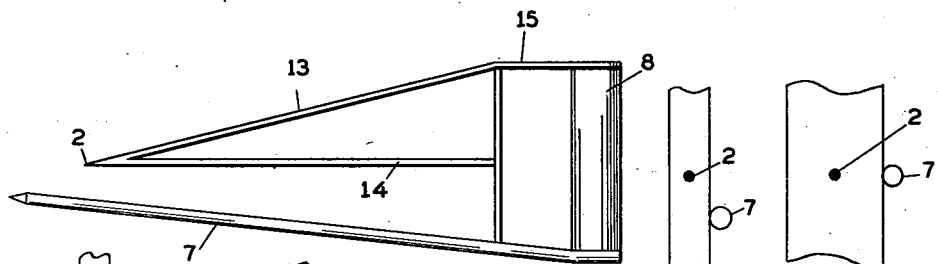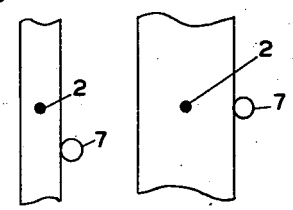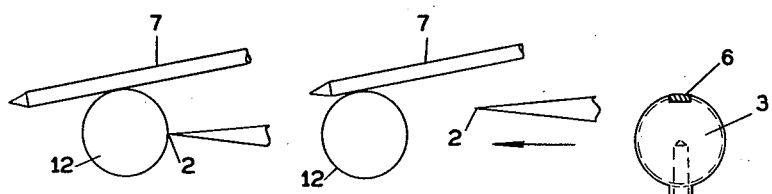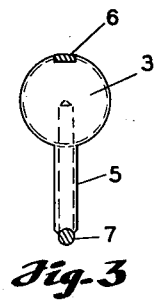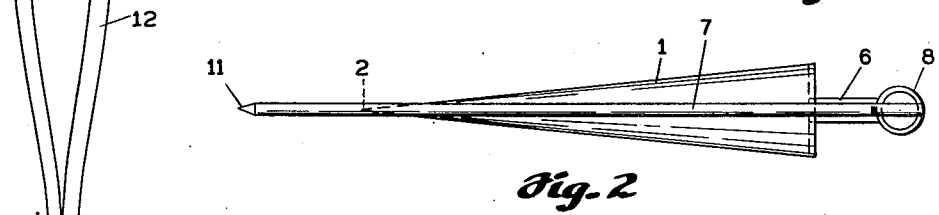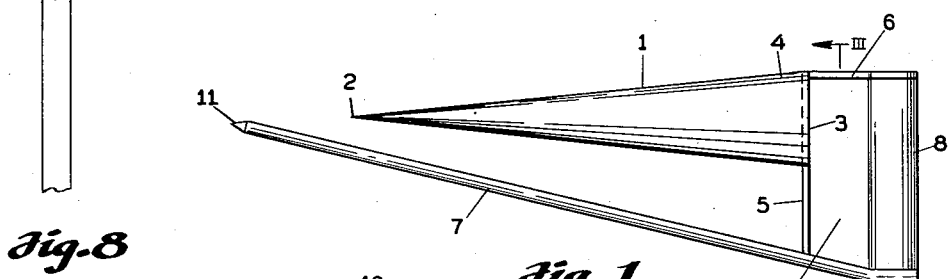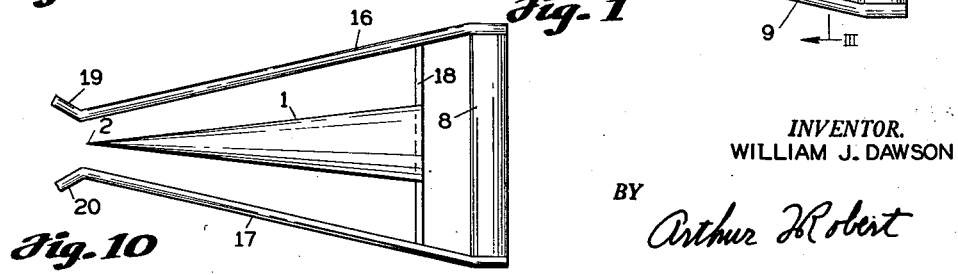
*INVENTOR.*
WILLIAM J. DAWSON
BY Arthur Robert
ATTORNEY

2,808,683

TOOL FOR SPLITTING GROWING TOBACCO PLANTS

William J. Dawson, Stanley, Ky.

Application September 23, 1954, Serial No. 457,924

4 Claims. (Cl. 47—1)

The present invention relates to a tool for splitting growing tobacco plants of the burley variety.

In the harvesting of burley tobacco the present practice is to cut off the plants near the ground, and then "stake" the plants in the field. The stake comprises a pole set in the ground and extending a few feet above the ground. A pointed thimble is placed on the top of the stake, and a plant then is impaled on the stake by holding the plant with its stalk in a generally horizontal position and pushing the stalk down against the thimble to impale the plant on the stake, the point where the plant is impaled being about one third the length of the stalk from the cut end. In impaling the plant in this manner, the stalk is split for a portion of its length by the wedging action of the tapered thimble. About six plants are thus impaled on a stake and the plants are left in the field for a few days to dry out, in order to yellow the leaves.

Generally, the leaves on the plant may be grouped, starting at the cut end, as "trash," lugs, red leaf, and tips. The most valuable part are the lugs, which are used extensively in cigarette making, and the "trash" is nearly of the same value. In this connection the term "trash" is misleading, and the term probably came into use because of the ragged, torn appearance of the leaves. The red leaf is of considerably less value, and the tips are the least valuable.

Upon leaving the staked plants in the field for a few days, the stem or stalk will dry out well at the cut end, but the remainder of the stalk carrying part of the lugs, and the red leaf will not dry well, so that, when the leaf is stripped from the stalk a portion of the stalk will rip off with the leaf. Also, because of the inadequate drying, the lugs which are the most valuable part of the plant, and some of the other leaves are subject to rot at the stem when the stakes are hung in the barn to cure, or when the stripped leaves are tied into "hands."

It has been proposed to split the plant vertically in the field, from the top down, but this procedure has the disadvantage that it is slow and tedious, it is difficult to avoid breaking off leaves, and the plants will not stand after being split in this way so they must be cut and staked immediately. This practice has been generally discontinued.

It is an object of the present invention to provide a tool for splitting the tobacco stalk as it stands in the field at a region adjacent the lug leaves to facilitate drying of the stalk in this region.

A further object is the provision of such a tool which is easily and quickly manipulated to pierce the stalk near the middle, and which is easily employed regardless of the variation in diameter of the stalks.

The tool of the present invention comprises a pointed tapered member for piercing the stalk, the member having a hilt or handle at its large end, by which it is manipulated, and the tool preferably includes a guide or gauge projecting a suitable distance beyond the point of the tapered member, for directing the point to the center of the stalk. In use the tool is held generally horizontally with the gauge positioned against the stalk so as to guide the point of the tapered member to engage the stalk approximately at the middle of its thickness. The tapered member then is pushed into the soft stalk up to the hilt and because of its large diameter it splits the stalk lengthwise for a considerable distance both above and below the point where the member enters. The tool is readily used on different diameter stalks because the piercing point is easily centered.

The invention will be described in greater detail in the following specification taken in connection with the accompanying drawing illustrating a preferred embodiment of the invention by way of example, and wherein:

Figure 1 is a plan view of the tool in its operative position;

Figure 2 is a side elevational view of the tool;

Figure 3 is a cross section taken on line III—III of Figure 1;

Figures 4 and 5 are schematic views in plan showing the manner of using of the tool;

Figure 6 is a diagrammatic view in elevation showing the tool in the position corresponding to Figure 5;

Figure 7 is a view similar to Figure 6 showing the centering of the tool in smaller size stalks;

Figure 8 is a diagrammatic view showing how the stalk is split by the tool; and

Figures 9 and 10 are views similar to Figure 1 of modifications.

Referring to the drawing, the impaling or splitting portion of the tool comprises a conical member 1, preferably formed from sheet steel rolled into a cone, and having its end 2 ground to a sharp point. An L-shaped strap of suitable thickness provides a circular portion 3 welded or otherwise suitably secured to the larger end 4 of the cone, a bar portion 5 extending from the circular portion generally transversely to the cone axis, and a bar portion 6 bent to extend generally axially of the cone axis. A gauge rod 7 is welded to the end of bar 5, and a handle grip 8 is welded to the end of bar 6 and to one end of gauge rod 7. The handle grip 8 is welded to bar 6 spaced sufficiently from the large end of cone 1 to permit insertion of the fingers through opening 9 so the handle 8 may be gripped firmly. The gauge bar 7 extends generally along the cone face not necessarily parallel to the cone face and in spaced relation to the cone to a point 11 well beyond the pointed end 2 of the cone.

I have found that suitable dimensions for the tool are the following: length of cone 1 about 9½ inches; largest diameter of cone about 1¾ inches; distance between gauge and cone point measured transversely to the cone axis, about ⅝ inch, and extension of gauge beyond point of cone, about 2½ inches. It will be understood that these dimensions are illustrative only, and the invention is not limited to the dimensions specified.

The use of the invention now will be explained. The stalks of burley tobacco plants vary in diameter and in the red leaf region may be as large as about 1¼ inches. Some stalks may be of considerably lesser diameter and such smaller diameter stalks may be split with my tool, but generally the smallest stalks dry adequately without being split. The operator grasps the handle 8 with one hand and bracing the tobacco stalk 12 with the other hand, he brings the gauge rod 7 alongside against the plant, as shown in Figure 4, the gauge rod being in a generally horizontal position. The tool then is pushed forward to penetrate the stalk, as shown in Figures 5 and 6, and the gauge thus positions the point 2 at about the middle of the stalk. By pushing the cone in to the hilt the stalk is split lengthwise as shown in Figure 8 for a distance approximately twelve inches, more or less above and below the point of entrance of the cone.

In treating a smaller diameter stalk, after the gauge is brought against the stalk, the tool may be turned about the gauge as a pivot to bring the point 2 at approximately the middle of the stalk thickness, as illustrated in Figure 7 before the point is jabbed into the stalk. On the other hand, if the stalk is slightly larger than twice the space between the point and gauge, the point will be near enough to the middle for practical purposes, as it is only necessary to split the stalk through the pithy center.

In the modification shown in Figure 9, wherein like parts are correspondingly numbered, the tapered member is made up of two narrow rods 13, 14 welded together at the apex 2 which is ground to a point. The other ends of these rods are welded to an L-shaped bar 15, with the handle 8 welded at one end of the L-bar, and the gauge 7 welded at the other end. The gauge extends to and is welded to handle 8.

If desired, the gauge rod 7 may be omitted, although without the gauge the tool is not as easily manipulated to find the center of the stalk.

In the modification shown in Figure 10, there are two gauge rods 16 and 17 attached to the end bar 18. These gauge rods are flared outwardly at their ends, as indicated at 19, 20, and they have sufficient resiliency so as to accommodate a stalk between them wider than the normal distance between point 2 and the gauge rods. Thus, the point 2 is automatically centered for piercing the stalk.

The splitting operation herein described is a novel operation in tobacco growing and has a number of advantages. By splitting the upper end of the stalk (the tool is usually inserted at a point about one third down from the top), the drying out of the sap in the upper part of the plant is facilitated, and a desirable yellowing of the leaves occurs. Burley tobacco is usually air cured for about ninety to one hundred days before it is ready for market, and the splitting of the stalk in this manner eliminates rotting at the base of the leaf during airing. If the stalk is not well dried, when the leaves are stripped off and tied into bundles or "hands" for marketing the ends of the leaves may rot. The splitting of the stalk, eliminates this possibility of rotting because the stalk becomes well dried during the curing period.

The tool is easy to use, and stalks may be quickly split while they stand in the field. It is easy to manipulate the tool so as to avoid breaking off leaves from the stalk. If desired, the splitting may take place a few days before the stalk is cut and staked so as to improve the drying action on the stakes.

It will be appreciated that each tool disclosed in this application comprises: a rear structure; and an elongate penetrating member; and an elongate gauge member. As shown in Fig. 1, the rear structure comprises parts 5 and 6, handle 8 and the rear end portion of gauge member 7. These parts cooperate with each other to form the finger accommodating opening 9.

Each of the penetrating and gauge members may be viewed as having a top, a bottom and opposite lateral sides. However, in use, each may be used with its top side or its bottom side uppermost. Each of these members is secured at its rear end to the rear structure and disposed to extend forwardly therefrom in the general direction of its length.

Each penetrating member terminates at its forward end in a penetrating point 2. It is adapted to be driven horizontally forward into and through a tobacco stalk with its penetrating point foremost. Its opposite sides diverge from adjacent said point horizontally rearward in a manner sufficiently not only to split the stalk but also to force the split portions to spread apart to a substantial degree as it is driven forwardly through the stalk.

Each gauge member is disposed along one lateral side of the penetrating member and horizontally spaced therefrom. Its forward end terminates forwardly of the penetrating point so that it may engage the side of a tobacco stalk before the penetrating point penetrates that stalk. When both members engage a stalk, the space between them is properly positioned to receive a split portion of the stalk.

I claim as my invention:

1. A tool for splitting the stalk of an upright tobacco plant comprising: a rear structure providing a handle shaped to be grasped in an operator's hand; an elongate penetrating member and an elongate gauge member, each having a top, a bottom and opposite lateral sides, each member being secured at its rear end to said rear structure and disposed to extend forwardly therefrom in the generation direction of its length; said penetrating member terminating at its forward end in a penetrating point, being adapted to be driven horizontally forward into and through a tobacco stalk with its penetrating point foremost and having its opposite sides diverge from adjacent said point horizontally rearward in a manner sufficient to split the stalk and force the split portions thereof to spread apart to a substantial degree as it is driven forwardly through the stalk; and said gauge member being disposed along one lateral side of, and in horizontally spaced relationship to, said penetrating member with its forward end terminating forwardly of said penetrating point, the space between said penetrating and said gauge members receiving a split portion of said stalk as said penetrating member is driven therethrough.

2. The tool of claim 1 wherein: said handle comprises a bar arranged to extend transversely of the penetrating member and being of sufficient length to be gripped by the hand.

3. The tool of claim 2 wherein: said rear structure includes another transverse member spaced forwardly from the handle with a finger accommodating opening therebetween; and the rear end portions of said members are attached to said other transverse member.

4. The tool of claim 1 wherein: said penetrating member is in the form of a cone.

References Cited in the file of this patent

UNITED STATES PATENTS

| | | |
|---|---|---|
| 144,503 | Burr | Nov. 11, 1873 |
| 311,375 | Robinson | Jan. 27, 1885 |
| 785,777 | Sylvester | Mar. 28, 1905 |
| 830,061 | Gauntlett | Sept. 4, 1906 |
| 2,610,883 | Aleshin | Sept. 16, 1952 |

FOREIGN PATENTS

| | | |
|---|---|---|
| 543,886 | Germany | Feb. 10, 1932 |